(12) United States Patent
Gibson et al.

(10) Patent No.: US 6,356,227 B1
(45) Date of Patent: Mar. 12, 2002

(54) SMEARING COMPENSATION APPARATUS FOR A RADAR SYSTEM

(75) Inventors: Timothy Gibson, Overland Park; Manuel Richey, Paola, both of KS (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/605,556

(22) Filed: Jun. 27, 2000

Related U.S. Application Data

(60) Provisional application No. 60/154,386, filed on Sep. 16, 1999.

(51) Int. Cl.$^7$ .............................................. G01S 13/90
(52) U.S. Cl. ........................................ 342/25; 342/195
(58) Field of Search .......................... 342/25, 175, 195

(56) References Cited

U.S. PATENT DOCUMENTS

| | | | | |
|---|---|---|---|---|
| 4,924,229 A | * | 5/1990 | Eichel et al. .................. | 342/25 |
| 5,034,812 A | * | 7/1991 | Rawlings ..................... | 358/108 |
| 5,184,133 A | * | 2/1993 | Tsao ............................. | 342/25 |
| H1720 H | * | 4/1998 | Chen ............................ | 342/25 |

OTHER PUBLICATIONS

Suzuki, T., "Radar Beamwidth Reduction Techniques," IEEE AES Systems Magazine, vol. 13, Issue 5, May 1998, pp. 43–48.*
Suzuki, T. "Radar Beam Cmpressors", Radar, 1996. Proceedings., CIE International Conference of, 1996, pp. 18–23.*

* cited by examiner

*Primary Examiner*—Ian J. Lobo

(57) ABSTRACT

A smearing compensation apparatus for a radar system having a scanning antenna is provided. The apparatus includes a first memory for storing a plurality of data streams, with each data stream corresponds to a radar signal received at a different angular position of the antenna, and a second memory stores radiation pattern data of the antenna. A frequency domain transform processor performs a frequency domain transform on the radiation pattern data stored in the second memory to produce a frequency characteristic of the radiation pattern data. A compensation function processor applies a compensation function to the frequency characteristic of the radiation pattern data to produce a compensated frequency characteristic. An inverse frequency domain transform processor performs an inverse frequency domain transform on the compensated frequency characteristic to produce digital filter coefficients. A digital filter processes the plurality of data streams stored in the first memory using the digital filter coefficients.

27 Claims, 10 Drawing Sheets

SMEARING COMPENSATION APPARATUS FOR A RADAR SYSTEM

CROSS-REFERENCE TO RELATED APPLICATION

This application claims the benefit of provisional application no. 60/154,386, filed Sep. 16, 1999.

BACKGROUND OF THE INVENTION

1. Field of the Invention

A radar system typically includes an antenna that mechanically or electronically scans a target. Such a radar system can be used, for example, in search and rescue operations and as a weather or mapping radar. The resolution of the radar system in the scanning directions will be affected by the characteristics of a radiation pattern of the antenna. For example, smearing is a phenomenon that occurs when a target is made to look much bigger than it actually is because of limits in the resolution caused by the antenna beam shape.

The invention relates generally to improving the resolution of a radar system, and more particularly to compensating for the effects of smearing in the scanning direction.

2. Description of the Prior Art

As shown in FIG. 1, a radar system, for example an airborne search and rescue radar, may have an antenna 105 that scans for targets 110 in the azimuth direction. As the antenna scans across a target, e.g., a small boat, the radar system may receive multiple returns depending upon the beamwidth 115 of the antenna radiation pattern in the azimuth plane.

In the resulting radar system output, as shown in FIG. 2, the region 205 illuminated on the display 210 which corresponds to the target may be broadened, i.e., smeared, in the azimuth dimension. The smearing of the radar output reduces the azimuth resolution of the system so that multiple targets that are positioned close together in azimuth may be indistinguishable.

In a typical system, the azimuth resolution is limited approximately to the half power beamwidth (HPBW) of the antenna. For example, if the antenna has a HPBW of 10°, a small target will appear on the radar screen as an arc, concentric about the aircraft, of approximately 10°, even though the target actually may only intersect a fraction of a degree in the azimuth plane. In such a case, multiple targets that are separated by less than 10° in azimuth may be indistinguishable, i.e., they will not appear as distinct targets.

Prior systems, such as synthetic aperture radar (SAR) have employed signal processing (typically optical or digital) to improve azimuth resolution. In a typical SAR system, an antenna is positioned on an aircraft that is moving at a constant altitude and velocity, and azimuth scanning occurs linearly, at a rate equal to the velocity of the aircraft. Such a configuration is impractical for applications such as search and rescue, which require radial scanning.

More fundamentally, SAR systems rely on the interference phenomenon of complex signals and achieve increased azimuth resolution by coherently processing received radar signals, i.e., by processing amplitude and phase information. Consequently, SAR systems generally are significantly more complex and costly than corresponding non-coherent radar systems.

There is a need for a relatively simple, economical radar system that can improve azimuth resolution.

SUMMARY OF THE INVENTION

It is a general object of the present invention to provide a radar system with improved resolution in the scanning direction.

It is another object of the present invention to provide a radar system with improved resolution in the scanning direction having a radial scanning rate compatible with search and rescue applications.

It is another object of the present invention to provide a radar system that can improve resolution in the scanning direction by processing received signals using antenna pattern information, in order to reduce cost and complexity.

In accordance with the objects described above, one aspect of he present invention provides a smearing compensation apparatus for a radar system having a scanning antenna. The apparatus includes a first memory for storing a plurality of data streams, with each data stream corresponding to a radar signal received at a different angular position of the antenna. A second memory stores radiation pattern data of the antenna. A frequency domain transform processor performs a frequency domain transform on the radiation pattern data stored in the second memory to produce a frequency characteristic of the radiation pattern data. A compensation function processor applies a compensation function to the frequency characteristic of the radiation pattern data to produce a compensated frequency characteristic, and an inverse frequency domain transform processor performs an inverse frequency domain transform on the compensated frequency characteristic to produce digital filter coefficients. A digital filter processes the plurality of data streams stored in the first memory using the digital filter coefficients.

Another aspect of the present invention provides a radar system including the above described apparatus and, in addition, a scanning antenna, a transmitter for generating radar signals and outputting the radar signals to the antenna, and a receiver for receiving radar signals from the antenna.

Aspects of the present invention may include one or more of the following features. The radiation pattern data stored in the second memory may include an azimuth pattern of the antenna, or may include a plurality of azimuth patterns of the antenna, with each azimuth pattern corresponding to an elevation angle.

Each of the plurality of data streams may include information for all target ranges of the radar system at a particular angular position of the antenna. A third memory may store a summation of a plurality of data streams corresponding to the same angular position of the antenna, and an averaging processor may compute an average of the plurality of data streams corresponding to this angular position.

The compensation function may be a multiplicative inverse, and the frequency domain transform may be a discrete Fourier transform. The inverse frequency domain transform may be an inverse discrete Fourier transform.

Another aspect of the present invention provides smearing compensation apparatus for a radar system having a scanning antenna. The apparatus includes a first memory for storing a plurality of data streams, with each data stream corresponding to a radar signal received at a different angular position of the antenna, and a second memory that stores digital filter coefficients. A digital filter processes the plurality of data streams stored in the first memory using the digital filter coefficients stored in the second memory. The digital filter coefficients are determined by performing a frequency domain transform on radiation pattern data of the antenna to produce a frequency characteristic of the radiation pattern data, applying a compensation function to the frequency characteristic of the radiation pattern data to produce a compensated frequency characteristic, and performing an inverse frequency domain transform on the compensated frequency characteristic.

Another aspect of the present invention provides a smearing compensation apparatus for a radar system having a scanning antenna. The apparatus includes a first memory for storing a plurality of data streams, with each data stream corresponding to a radar signal received at a different angular position of the antenna, and a second memory for storing radiation pattern data of the antenna. A transform means performs a frequency domain transform on the radiation pattern data stored in the second memory to produce a frequency characteristic of the radiation pattern data. A compensation means applies a compensation function to the frequency characteristic of the radiation pattern data to produce a compensated frequency characteristic. An inverse transform means performs an inverse frequency domain transform on the compensated frequency characteristic to produce digital filter coefficients. A digital filter processes the plurality of data streams stored in the first memory using the digital filter coefficients.

Another aspect of the present invention provides a smearing compensation method for a radar system having a scanning antenna. The method includes the step of storing in a first memory a plurality of data streams, each data stream corresponding to a radar signal received at a different angular position of the antenna, and storing radiation pattern data of the antenna in a second memory. A frequency domain transform is performed on the radiation pattern data stored in the second memory to produce a frequency characteristic of the radiation pattern data. A compensation function is applied to the frequency characteristic of the radiation pattern data to produce a compensated frequency characteristic. An inverse frequency domain transform is performed on the compensated frequency characteristic to produce digital filter coefficients. The plurality of data streams stored in the first memory is processed with a digital filter using the digital filter coefficients.

These and other objects, features and advantages of the present invention will become more apparent upon a consideration of the following description of the preferred embodiments of the present invention taken in conjunction with the accompanying drawings.

DETAILED DESCRIPTION

Figure 3:
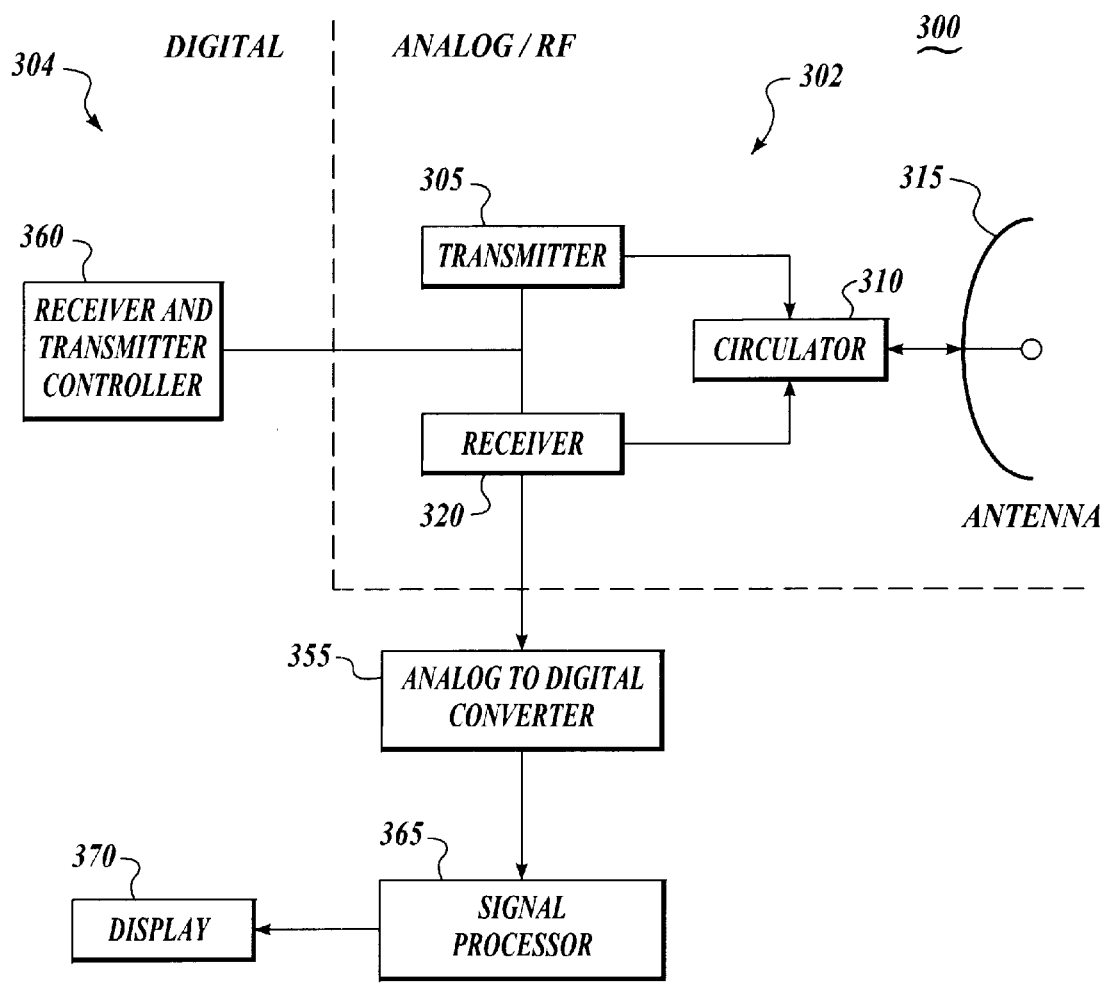
FIG. 3 is a block diagram of a radar system in accordance with the present invention.

A radar system 300 in accordance with the present invention is shown generally in FIG. 3. The radar system is comprised generally of an analog/radio frequency (RF) section 302 for generating and processing radar signals, and a digital section 304 that converts analog output from the RF section 302 into digital data.

The RF section 302 includes a transmitter 305 that generates and outputs a high power RF radar signal through a circulator 310 to an antenna 315. The antenna 315, e.g., a mechanically-scanned, parabolic dish, radiates the radar signal primarily in the azimuth pointing direction. Radar signals are transmitted at incremental azimuth positions, or radials, as the antenna 315 is scanned. Alternatively, the radar signal may be transmitted repeatedly at a single radial.

A portion of the radar signal may be reflected by a target in the pointing direction and received by the antenna 315. The received signal, which generally is much weaker than the original transmitted signal, passes through the circulator 310 to a receiver 320. The circulator 310 isolates the receiver 320 from the transmitter 305 to prevent the high power transmitted signals from damaging the sensitive components of the receiver 320. The receiver 320 converts the received signal into an analog output for further processing.

The digital section 304 of the radar system 300 converts the analog output of the RF section 302 into digital data using an analog to digital (A/D) converter 355. The digital section 304 also includes a controller 360 that controls the transmitter 305 and receiver 320.

A signal processor 365, as further discussed below, performs various operations on the digital data output by the A/D converter 355 to prepare it for output to the display 370. For example, target range information is determined based on the timing of the transmission and reception of the radar signal.

Figure 1:
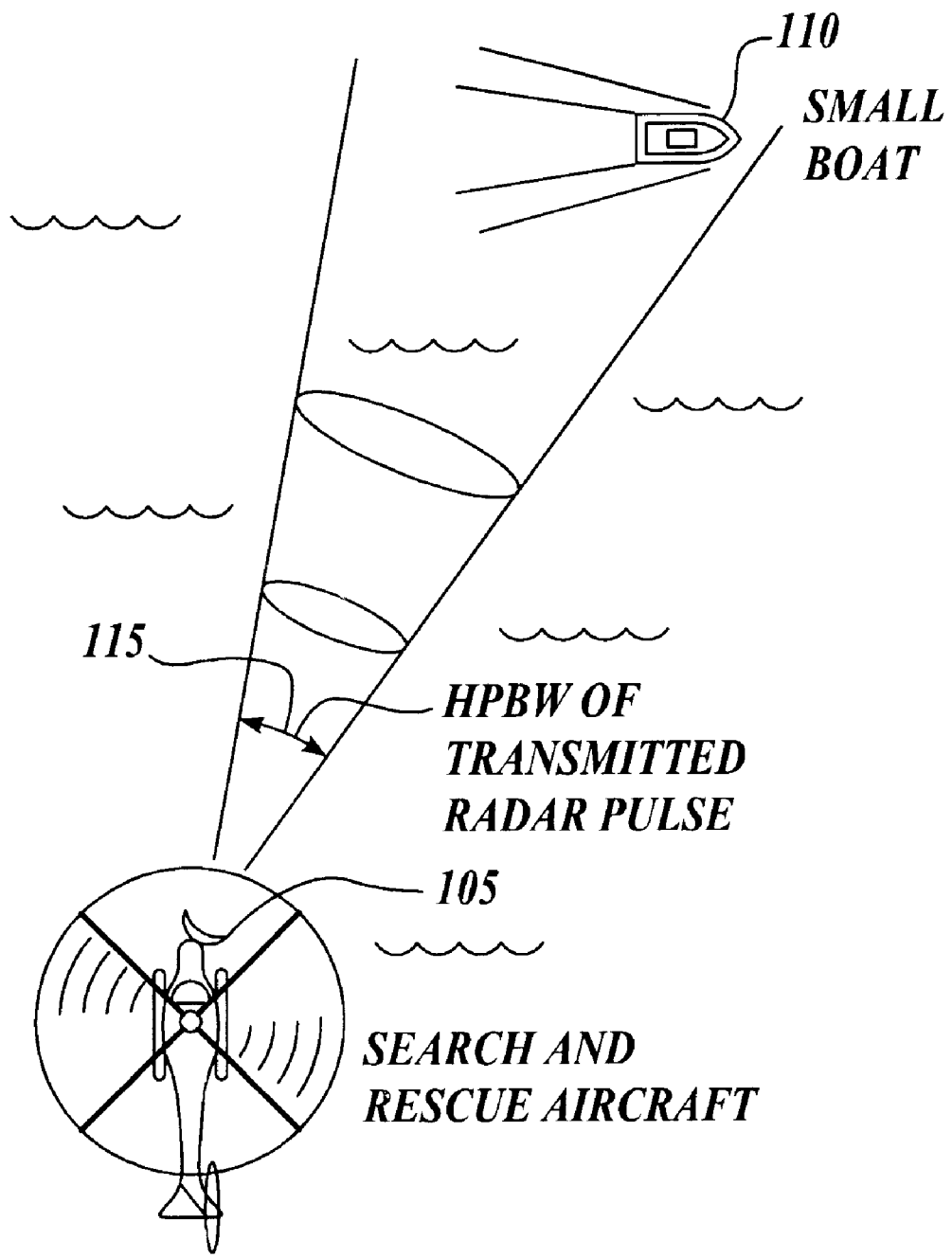
FIG. 1 is diagram of a search and rescue radar system scanning a target.
Figure 2:
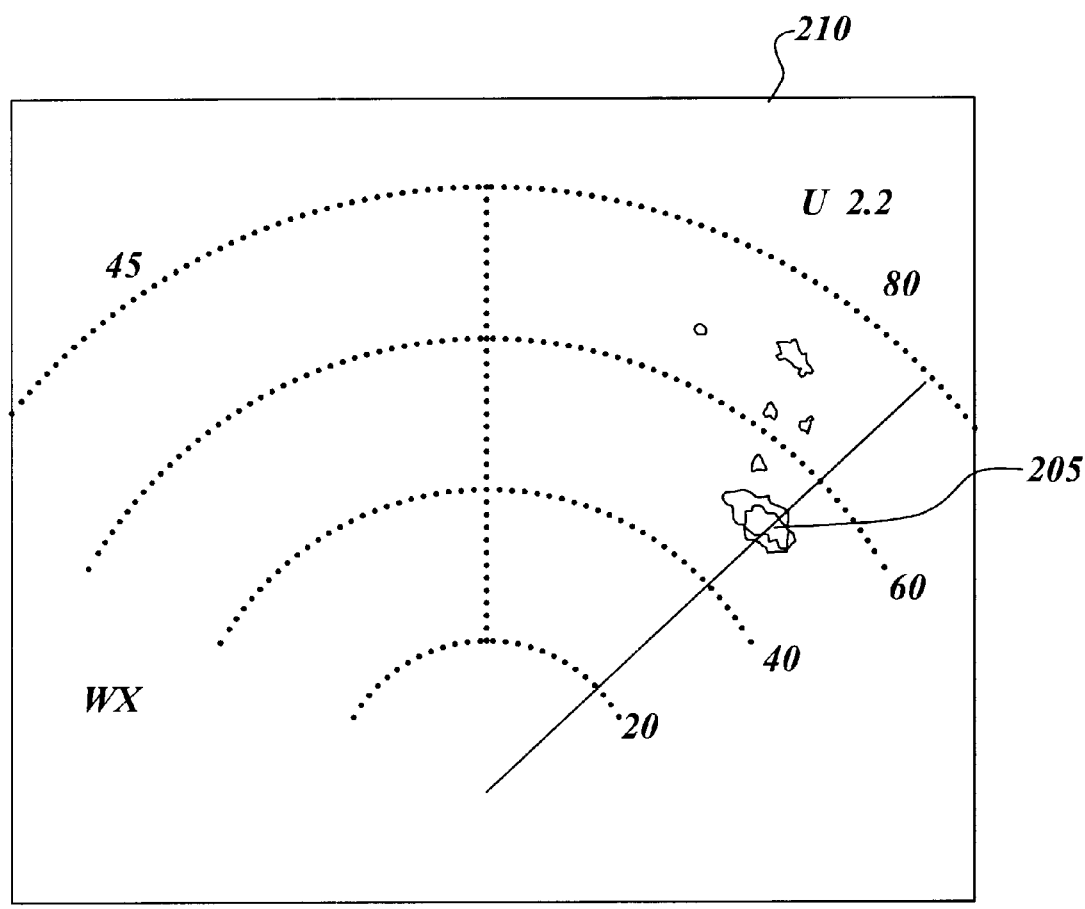
FIG. 2 is a radar system display showing a target.

Data is output to the display 370 as data streams that each correspond to all possible target ranges for a particular radial. As the antenna 315 scans through each radial, the data stream for the radial is output to the display 370, where it overwrites the data from the previous scanning interval. A target present at a particular radial may appear on the display 370 as a region 205 that is color-coded to represent the intensity of the received radar signal (e.g., as shown in FIG. 2).

As discussed above, radar signals may be transmitted toward and received from a particular target in several adjacent radials due to the radiation pattern of the antenna 315. This limits the angular resolution of the radar system 300, i.e., the minimum angular separation necessary to distinguish separate targets. The following discussion explains the relationship between the antenna radiation pattern (or beam shape) and the angular resolution of the radar system 300 and techniques that may be used to improve angular resolution by compensating for smearing.

Figure 4:
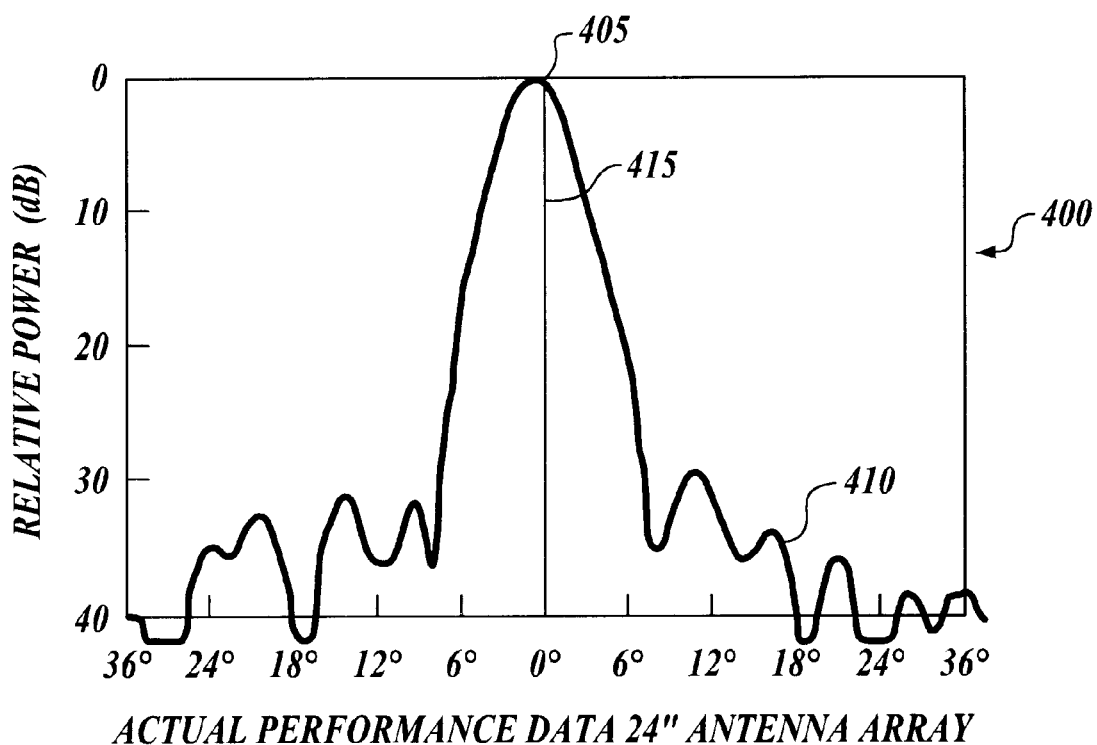
FIG. 4 is a plot of a measured antenna pattern.

FIG. 4 shows an example of a measured antenna radiation pattern 400 for a 24" diameter circular flat plate array antenna in the 0° elevation plane at about 9375 MHz. The peak antenna gain is at 0° azimuth or boresight 405. The relative gain, which is plotted in dB versus azimuth angle in degrees, decreases away from the boresight 405 direction until reaching low level sidelobes 410 on both sides of the main beam 415.

As the antenna scans across the target in the azimuth direction, the received signal will increase as the main beam 415 approaches the target position, reaches a maximum at the beam peak 405, and then decreases. The resulting radar system output will be a region that is smeared in the azimuth direction (e.g., as shown in FIG. 2).

The angular region over which radar signals are received for a particular target typically is estimated by the half power beam width (HPBW) (also referred to as the 3 dB beamwidth) of the antenna. The angular resolution of the radar system therefore is limited to approximately the HPBW of the antenna.

Figure 5:
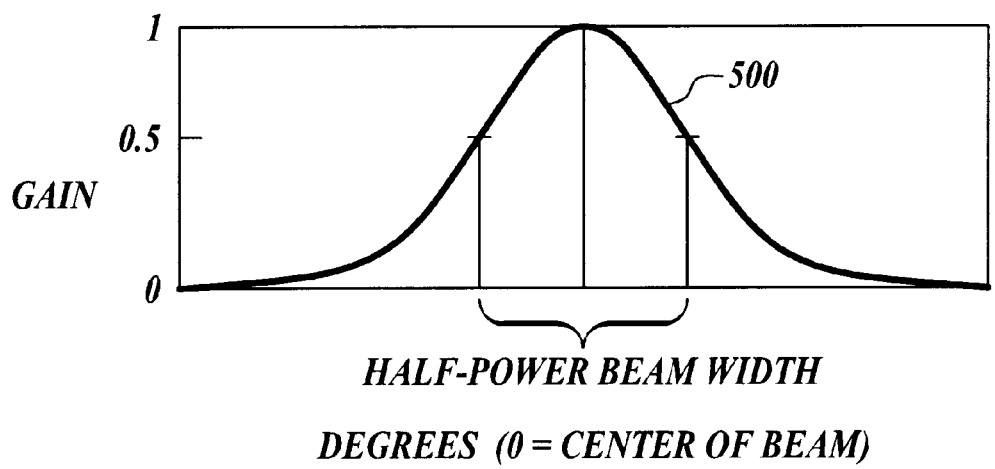
FIG. 5 is a plot of antenna gain versus angle.

FIG. 5 shows a hypothetical antenna radiation pattern expressed in terms of relative gain 500 (plotted on a linear scale) versus azimuth angle (in degrees). The pattern is for an elevation angle of 0° and covers the main beam portion of the overall radiation pattern. As the antenna scans in azimuth, the radar signal received from a particular target will vary over time due to the change in relative gain 500 (depending upon the rotation rate of the antenna). Hence, the antenna gain 500 corresponds to a time domain representation of the variation in the received signal due to the antenna beam shape.

Figure 6:
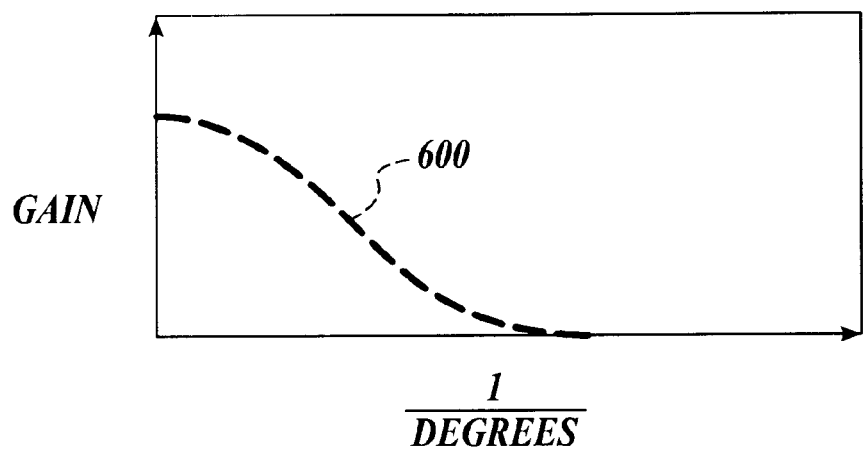
FIG. 6 is a plot of the frequency characteristic of antenna gain in FIG. 5.

Accordingly, as shown in FIG. 6, a discrete Fourier transform (DFT) may be performed to obtain the frequency characteristic 600 of the antenna gain. The resulting frequency characteristic 600 is similar to that of a low pass filter. The antenna gain 500 and frequency characteristic 600 of the antenna gain are expressed in terms of degrees and 1/degrees, respectively, to make the analysis independent of the antenna rotation rate.

Figure 7:
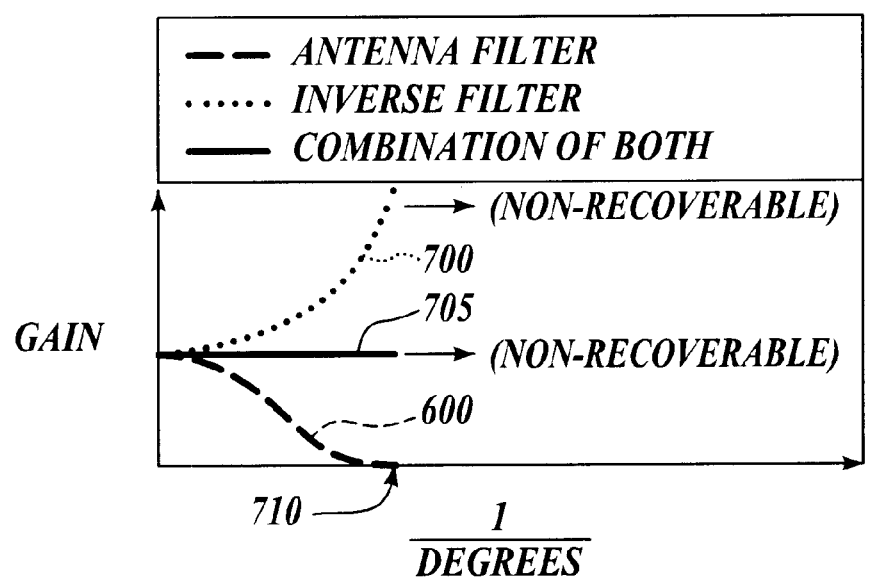
FIG. 7 is a plot of a digital filter that applies the inverse of the frequency characteristic of the antenna gain.

As shown in FIG. 7, in order to compensate for the low pass filtering effect of the antenna beam shape, a digital filter applies the inverse 700 of the frequency characteristic 600 of the antenna gain to the received signal. Hence, the resulting output 705 of the filter has a flat frequency characteristic. The low pass filtering effect of the antenna beam shape may attenuate the received signal to the point of being unrecoverable above a certain upper frequency limit 710. The inverse 700 filter is effective in compensating for the antenna beam shape up to this upper frequency limit 710.

Figure 8:
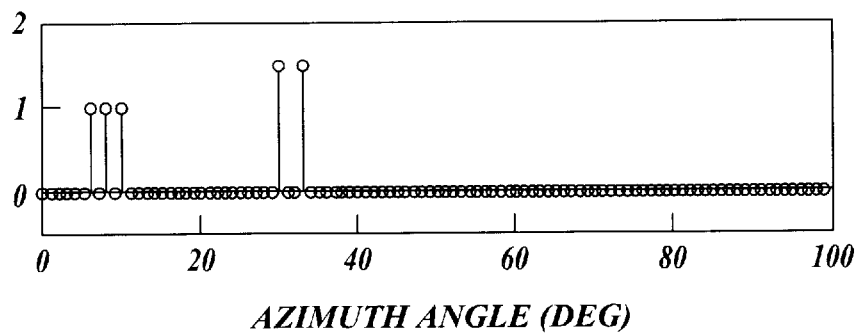
FIG. 8 is a plot of the positions of five targets that are located close together in two separate groups.
Figure 9:
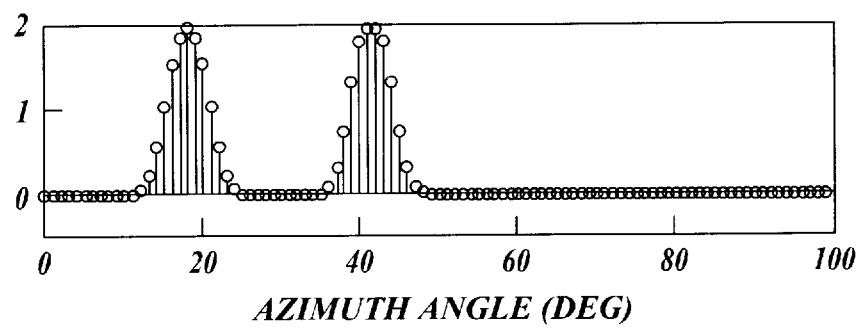
FIG. 9 is a plot of the radar system detection results without compensation.
Figure 10:
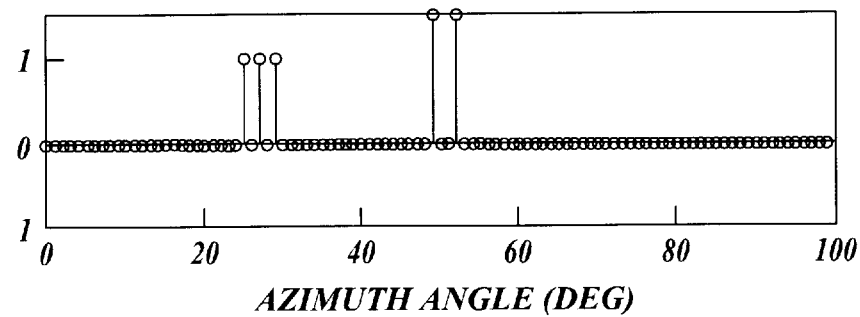
FIG. 10 is a plot of the radar system detection results with compensation.

FIGS. 8–10 show the results of a simulation of the technique described above. FIG. 8 is a plot of the positions of five targets that are located close together in two separate groups. FIG. 9 illustrates the radar system detection results without compensation. The antenna beam shape effectively smears the azimuth response of the radar system so that the three targets in the group of three are indistinguishable from each other. Likewise, the two targets in the other group also are indistinguishable from each other.

FIG. 10 shows the result of the compensation filtering described above. The targets are all distinguishable, which indicates that the azimuth resolution of the system has been significantly increased. The targets are shifted in azimuth due to processing delay, however, this may be accounted for and corrected in an actual system.

Figure 11:
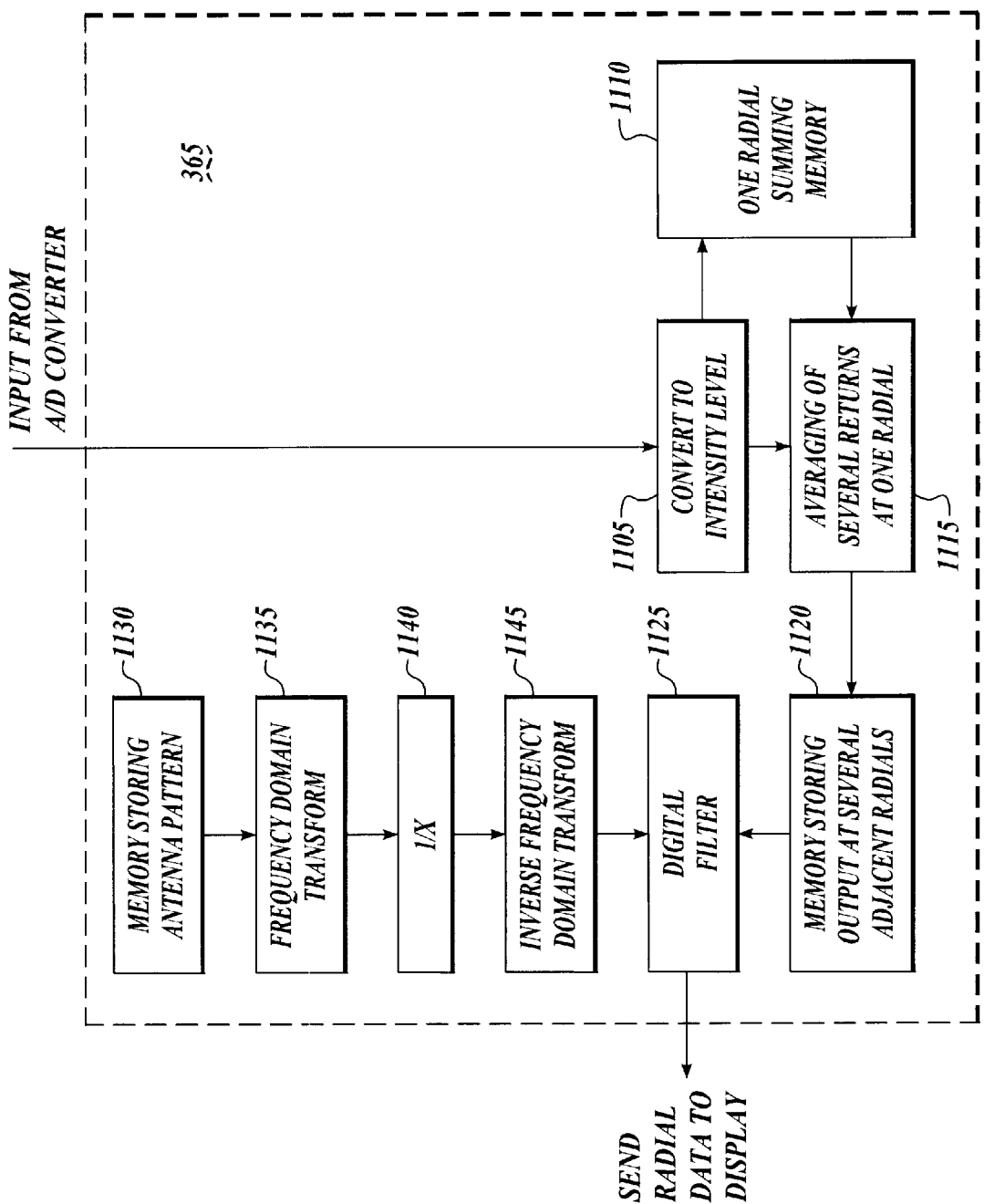
FIG. 11 is a block diagram of the smearing compensation signal processor in accordance with the present invention.

As shown in FIG. 11, the compensation filtering is implemented by the signal processor 365 (see FIG. 3), which converts the radar return data into display data. The digital data produced by the A/D converter 355 is input to the signal processor 365 and converted into an intensity level 1105. A summing memory 1110 receives the converted data and stores the data as a data stream corresponding to a single radial position of the antenna. If multiple radar signals are transmitted for a single radial, the received signals are averaged in an averaging processor 1115 to produce a single data stream for that radial.

The data streams, each corresponding to all ranges for a particular radial, are output to a memory 1120 that stores data for several adjacent radials. The memory 1120 functions essentially as a moving window for a particular radial of interest by storing a number of preceding and succeeding radials. These stored radials form a two-dimensional array of azimuth angle (radial) versus range, with each row of the two dimensional array being associated with a particular range value.

The data streams may be read out of the memory on a row-by-row basis. Each row corresponds to a time domain signal that, for a particular range, represents the variation in received signal due to antenna beam shape as the antenna scans in azimuth across the radial of interest. These time domain signals are processed by a digital filter 1125, which, as described below, applies a filter characteristic that essentially is the inverse (see, e.g., FIG. 7) of the frequency characteristic (see, e.g., FIG. 6) of the antenna gain (see, e.g., FIG. 5).

The coefficients of the digital filter 1125 are computed using measured antenna pattern (i.e., antenna gain) data stored in an antenna pattern memory 1130. The measured antenna pattern data may be obtained in a number of ways. For example, the antenna pattern may be measured as part of the radar system design process. Alternatively, the antenna pattern for each antenna may be measured as part of the manufacturing process, resulting in a unique data set for each system.

A frequency domain transform processor 1135 performs a frequency domain transform, for example, a discrete Fourier transform, on the measured antenna gain data to produce a frequency characteristic (as in FIG. 6). Other frequency domain transforms alternatively may be used, such as Laplace, Z, etc. A compensation function processor 1140 applies a compensation function, such as a multiplicative inverse function (1/X), to the frequency characteristic (as in FIG. 7). The compensation function may be adjusted as necessary to optimize system performance. An inverse frequency domain transform is performed by an inverse frequency domain transform processor 1145 on the compensated frequency characteristic to produce the coefficients of the digital filter. Alternatively, the coefficients of the digital filter may be computed from the measured antenna pattern data as described above, stored in memory, and output to the digital filter 1125.

The data processed by the digital filter 1125 is output to the display where it is reassembled into a data stream for the radial of interest and displayed on a screen. For example, if the midpoint of each row of processed data corresponds to the radial of interest, the midpoint of each row of data may be extracted to form a data stream corresponding to the radial of interest. The data stream is output to the display screen, where it overwrites the existing data, if any, for that radial. Alternatively, the rows of processed data may be reassembled into an array and output to the display screen as a series of data streams, each data stream corresponding to a radial.

Generally, if the target positions are close in elevation to the beam peak, for example within the 3 dB beamwidth, the compensation algorithm may be based on a single azimuth pattern measured at 0° elevation, as in the examples discussed above. However, in applications such as search and rescue radar systems, targets may be located at relatively large elevations angles that are outside the beamwidth for which compensation based on a single azimuth pattern is effective. In such cases, the compensation algorithm may employ a two dimensional antenna radiation pattern, rather than a single azimuth pattern. The two dimensional pattern may be formed by measuring azimuth patterns for a number of different elevation angles.

Figure 12:
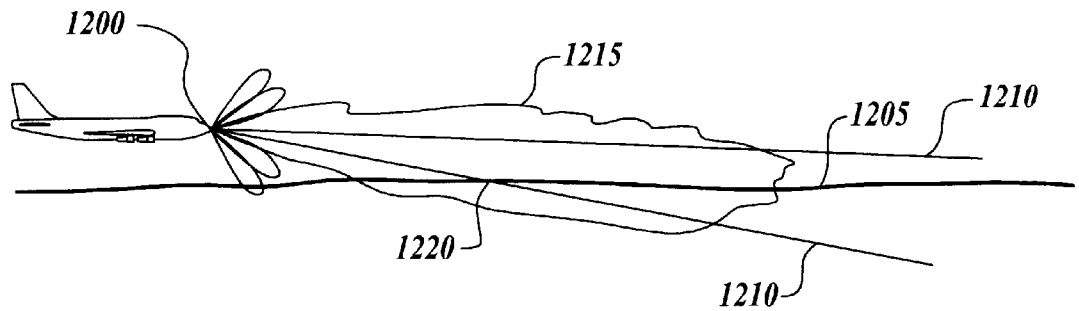
FIG. 12 is diagram of the elevation pattern of a search and rescue radar antenna at low altitude and low tilt angle.

FIG. 12 shows an elevation pattern for a first example of an airborne search and rescue radar system antenna 1200 that is scanning the surface 1205 of a body of water. The antenna 1200 is pointed down toward the surface 1205 at a relatively small tilt angle (relative to horizontal), due to the relatively low altitude of the aircraft. The 3 dB points 1210 of the elevation pattern 1215 (or, alternatively, the beamwidth for which compensation based on a single azimuth pattern is deemed to be effective) intersect the surface 1205 at a point near the aircraft 1220 and at a distant point (not shown). In such a case, a single azimuth pattern could be used for the compensation algorithm over the entire useful search range of the system.

Figure 13:
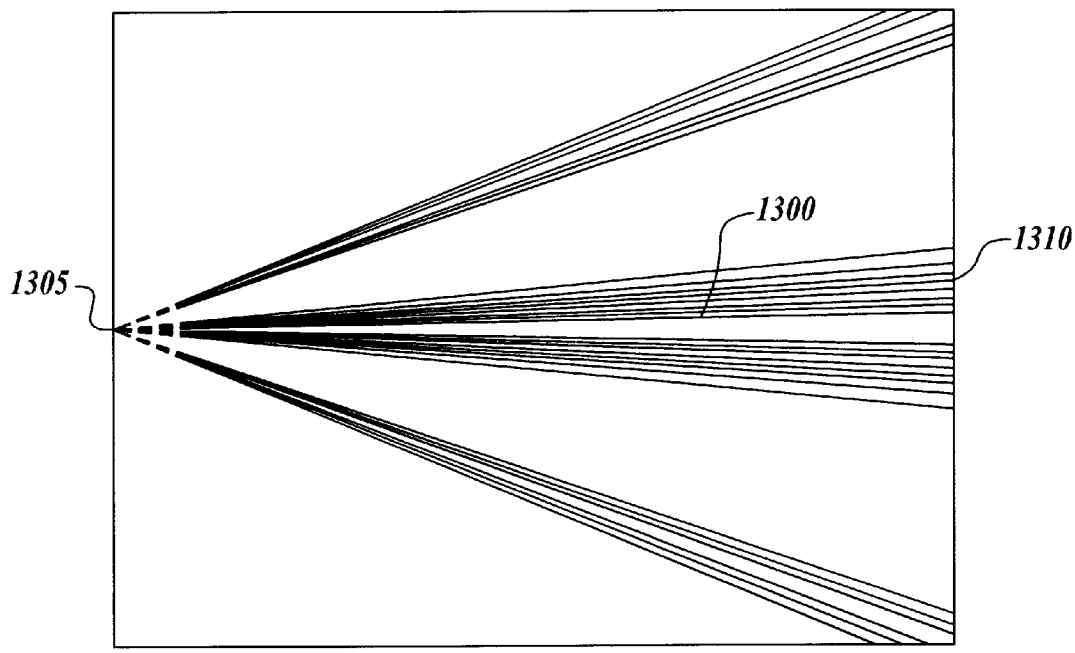
FIG. 13 is a contour plot of the radiation pattern of the antenna of FIG. 12 projected on the surface of a body of water.

This is further illustrated in FIG. 13, which is a contour plot of the antenna radiation pattern projected on the surface of the water. The 3 dB beam contour 1300 extends from a point 1305 immediately in front of the aircraft out to the search range limit. The remaining contours 1310 each represent a 1 dB change in power.

Figure 14:
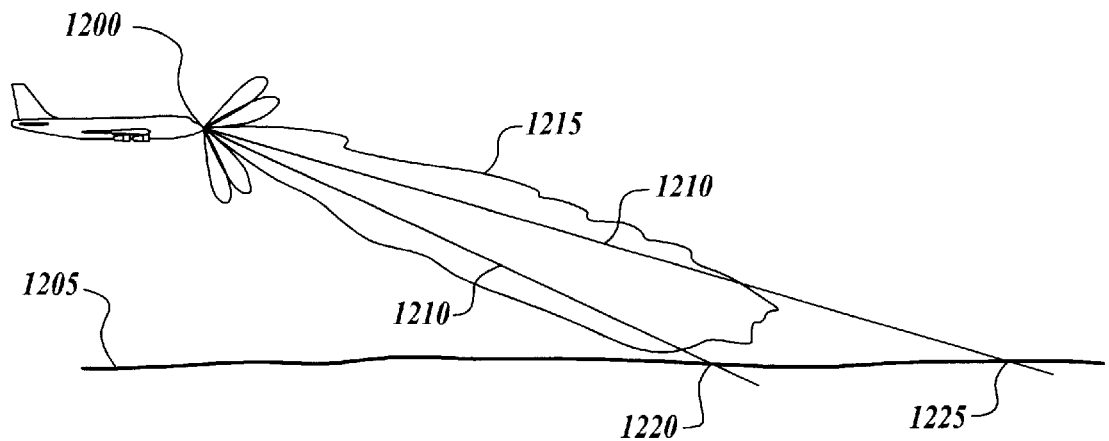
FIG. 14 is diagram of the elevation pattern of a search and rescue radar antenna at high altitude and high tilt angle.
Figure 15:
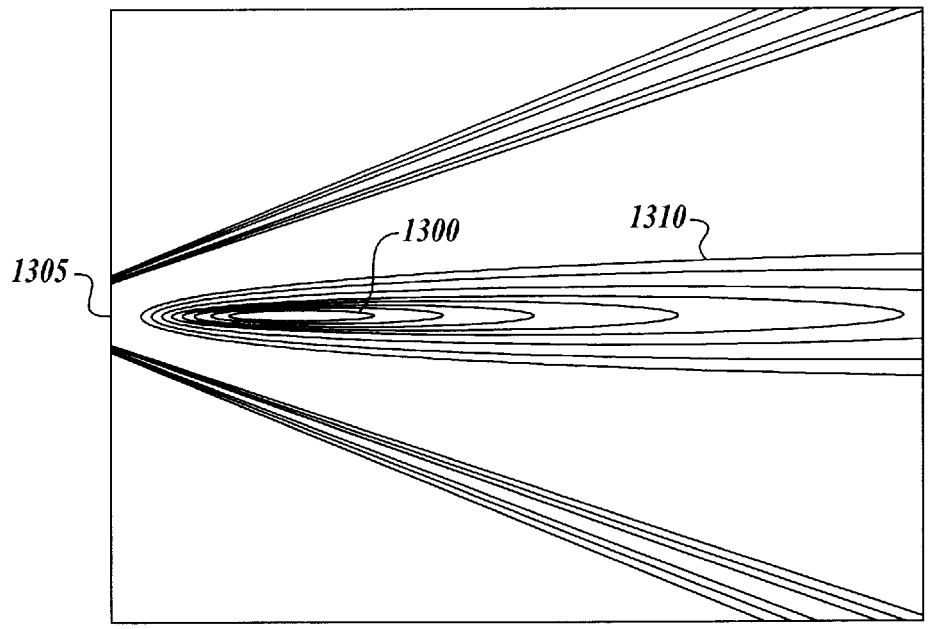
FIG. 15 is a contour plot of the radiation pattern of the antenna of FIG. 14 projected on the surface of a body of water.

By contrast, FIGS. 14 and 15 show an elevation pattern for a second example in which the aircraft is flying at a relatively high altitude and the antenna 1200 is pointed down with a relatively large tilt angle. The 3 dB points 1210 intersect the surface 1205 at a point 1220 some distance in front of the aircraft and extends through only a portion of the search range (to a second point 1225). Consequently, the system would have to compensate based on a two dimensional antenna radiation pattern.

Figure 16:
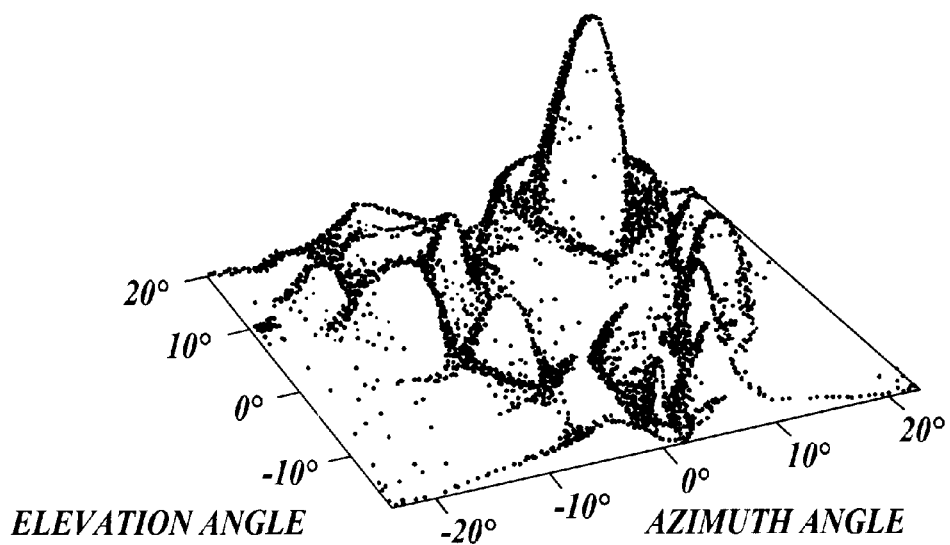
FIG. 16 is a plot of a two dimensional antenna radiation pattern.

FIG. 16 shows an example of a two dimensional antenna radiation pattern. A two dimensional pattern may be measured by making a series of azimuth pattern measurements at different elevation angles. The pattern may be stored as a two dimensional array in the antenna pattern memory (see FIG. 11).

In a two dimensional compensation processor, the elevation angle of each target may be determined, for example, geometrically from the range of the target, altitude of the aircraft, and the antenna tilt angle. Alternatively, the processor may determine ranges within which each stored azimuth pattern is to be applied based on the altitude of the aircraft and antenna tilt angle.

Figure 17:
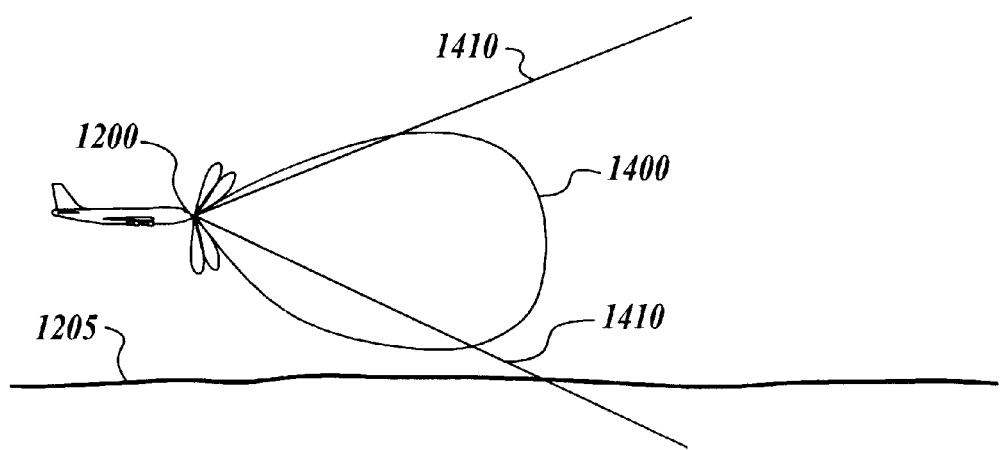
FIG. 17 is a diagram of the elevation pattern of a search and rescue radar antenna having a fan beam pattern.

FIG. 17 shows an elevation pattern for a third example in which the aircraft is at a relatively high altitude and the antenna 1200 is pointed down with a relatively large tilt angle, as in the second example. However, the antenna 1200 has a broad elevation radiation pattern 1400 (or fan beam), so the 3 dB points 1410 of the pattern cover a significant portion of the search range. Consequently, a single azimuth pattern could be used for the entire search range of the system.

Although specific embodiments of the present invention have been described above in detail, it will be understood that this description is merely for purposes of illustration. Various modifications of and equivalent structures corresponding to the disclosed aspects of the preferred embodiments, in addition to those described above, may be made by those skilled in the art without departing from the spirit of the present invention which is defined in the following claims, the scope of which is to be accorded the broadest interpretation so as to encompass such modifications and equivalent structures.

What is claimed is:

1. A smearing compensation apparatus for a radar system having a scanning antenna, the apparatus comprising:

a first memory for storing a plurality of data streams, each data stream corresponding to a radar signal received at a different angular position of the antenna;

a second memory for storing radiation pattern data of the antenna;

a frequency domain transform processor for performing a frequency domain transform on the radiation pattern data stored in the second memory to produce a frequency characteristic of the radiation pattern data;

a compensation function processor for applying a compensation function to the frequency characteristic of the radiation pattern data to produce a compensated frequency characteristic;

an inverse frequency domain transform processor for performing an inverse frequency domain transform on the compensated frequency characteristic to produce digital filter coefficients; and a digital filter for processing the plurality of data streams stored in the first memory using the digital filter coefficients.

2. The smearing compensation apparatus of claim 1, wherein the radiation pattern data stored in said second memory comprises an azimuth pattern of the antenna.

3. The smearing compensation apparatus of claim 1, wherein the radiation pattern data stored in said second memory comprises a plurality of azimuth patterns of the antenna, each azimuth pattern corresponding to an elevation angle.

4. The smearing compensation apparatus of claim 1, wherein each of the plurality of data streams comprises information for all target ranges of the radar system at a particular angular position of the antenna.

5. The smearing compensation apparatus of claim 1, further comprising a third memory for storing a summation of a plurality of data streams corresponding to the same angular position of the antenna; and an averaging processor for computing an average of the plurality of data streams corresponding to the same angular position of the antenna.

6. The smearing compensation apparatus of claim 1, wherein the compensation function is a multiplicative inverse.

7. The smearing compensation apparatus of claim 1, wherein the frequency domain transform is a discrete Fourier transform.

8. The smearing compensation apparatus of claim 1, wherein the inverse frequency domain transform is an inverse discrete Fourier transform.

9. A radar system comprising:
a scanning antenna;
a transmitter for generating radar signals and outputting the radar signals to the antenna;
a receiver for receiving radar signals from the antenna;
a first memory for storing a plurality of data streams, each data stream corresponding to a radar signal received at a different angular position of the antenna;
a second memory for storing radiation pattern data of the antenna;
a frequency domain transform processor for performing a frequency domain transform on the radiation pattern data stored in the second memory to produce a frequency characteristic of the radiation pattern data;
a compensation function processor for applying a compensation function to the frequency characteristic of the radiation pattern data to produce a compensated frequency characteristic;
an inverse frequency domain transform processor for performing an inverse frequency domain transform on the compensated frequency characteristic to produce digital filter coefficients; and
a digital filter for processing the plurality of data streams stored in the first memory using the digital filter coefficients.

10. The radar system of claim 9, wherein the radiation pattern data stored in said second memory comprises an azimuth pattern of said antenna.

11. The radar system of claim 9, wherein the radiation pattern data stored in said second memory comprises a plurality of azimuth patterns of said antenna, each azimuth pattern corresponding to an elevation angle.

12. The radar system of claim 9, wherein each of the plurality of data streams comprises information for all target ranges of the radar system at a particular angular position of said antenna.

13. The radar system of claim 9, further comprising a third memory for storing a summation of a plurality of data streams corresponding to the same angular position of said antenna; and
an averaging processor for computing an average of the plurality of data streams corresponding to the same angular position of said antenna.

14. The radar system of claim 9, wherein the compensation function is a multiplicative inverse.

15. The radar system of claim 9, wherein the frequency domain transform is a discrete Fourier transform.

16. The radar system of claim 9, wherein the inverse frequency domain transform is an inverse discrete Fourier transform.

17. The radar system of claim 9, wherein said antenna scans mechanically.

18. The radar system of claim 9, wherein said antenna scans electronically.

19. A smearing compensation apparatus for a radar system having a scanning antenna, the apparatus comprising:
a first memory for storing a plurality of data streams, each data stream corresponding to a radar signal received at a different angular position of the antenna;
a second memory for storing digital filter coefficients; and
a digital filter for processing the plurality of data streams stored in the first memory using the digital filter coefficients stored in said second memory,
wherein the digital filter coefficients are determined by performing a frequency domain transform on radiation pattern data of the antenna to produce a frequency characteristic of the radiation pattern data, applying a compensation function to the frequency characteristic of the radiation pattern data to produce a compensated frequency characteristic, and performing an inverse frequency domain transform on the compensated frequency characteristic.

20. The smearing compensation apparatus of claim 19, wherein the compensation function is a multiplicative inverse.

21. The smearing compensation apparatus of claim 19, wherein the frequency domain transform is a discrete Fourier transform.

22. The smearing compensation apparatus of claim 19, wherein the inverse frequency domain transform is an inverse discrete Fourier transform.

23. A smearing compensation apparatus for a radar system having a scanning antenna, the apparatus comprising:
a first memory for storing a plurality of data streams, each data stream corresponding to a radar signal received at a different angular position of the antenna;
a second memory for storing radiation pattern data of the antenna;
transform means for performing a frequency domain transform on the radiation pattern data stored in the second memory to produce a frequency characteristic of the radiation pattern data;
compensation means for applying a compensation function to the frequency characteristic of the radiation pattern data to produce a compensated frequency characteristic;
inverse transform means for performing an inverse frequency domain transform on the compensated frequency characteristic to produce digital filter coefficients; and
a digital filter for processing the plurality of data streams stored in the first memory using the digital filter coefficients.

24. The smearing compensation apparatus of claim 23, wherein said compensation means performs a multiplicative inverse.

25. The smearing compensation apparatus of claim 23, wherein said transform means performs a discrete Fourier transform.

26. The smearing compensation apparatus of claim 23, wherein said inverse transform means performs an inverse discrete Fourier transform.

27. A smearing compensation method for a radar system having a scanning antenna, the method comprising the steps of:
storing in a first memory a plurality of data streams, each data stream corresponding to a radar signal received at a different angular position of the antenna;
storing radiation pattern data of the antenna in a second memory;
performing a frequency domain transform on the radiation pattern data stored in the second memory to produce a frequency characteristic of the radiation pattern data;
applying a compensation function to the frequency characteristic of the radiation pattern data to produce a compensated frequency characteristic;
performing an inverse frequency domain transform on the compensated frequency characteristic to produce digital filter coefficients; and
processing the plurality of data streams stored in the first memory with a digital filter using the digital filter coefficients.

* * * * *